United States Patent [19]

Shichman et al.

[11] 4,244,770
[45] Jan. 13, 1981

[54] TIRE BUILDING MACHINE

[75] Inventors: Daniel Shichman, Stow; S. Edward Nold, Lisbon; George E. Enders, Salem, all of Ohio

[73] Assignee: NRM Corporation, Akron, Ohio

[21] Appl. No.: 22,429

[22] Filed: Mar. 21, 1979

[51] Int. Cl.³ .................... B29H 17/16; B29H 17/26
[52] U.S. Cl. .................... 156/398; 156/132; 156/401; 156/403; 156/416
[58] Field of Search ............... 156/131, 132, 398–401, 156/414–417; 92/240, 107, 108, 177

[56] References Cited

U.S. PATENT DOCUMENTS

| | | | |
|---|---|---|---|
| 2,145,806 | 1/1939 | Schnedarek | 156/416 |
| 2,779,996 | 2/1957 | Tanis | 156/416 X |
| 3,053,308 | 9/1962 | Vanzo et al. | 156/132 |
| 3,402,090 | 9/1968 | Henley | 156/398 |
| 3,784,437 | 1/1974 | Appleby et al. | 156/401 |
| 4,060,445 | 11/1977 | Houck | 156/132 |
| 4,081,310 | 3/1978 | Shichman et al. | 156/398 |

*Primary Examiner*—John E. Kittle
*Attorney, Agent, or Firm*—Maky, Renner, Otto & Boisselle

[57] ABSTRACT

A tire building machine of the expandable bead lock type employs an elastomeric specially shaped radially expanding bead lock including a shaping and turning bladder which includes an air passage system therethrough. The elastomeric bead lock is confined for radial expansion in an annular outwardly opening chamber in the form of an isosceles trapezoid in radial section with the elastomeric bead lock being of similar configuration and expanded by direct application of air pressure within the chamber. The configuration of the annular chamber and the bead lock compensate for stretching of the bead lock upon enlargement. The edges of the bead lock at the axial sides of the chamber are undercut for flexibility while the walls of the chamber are specially coated to maintain the seal. The bead lock incorporates interconnected metallic segment side plates which not only limit the stroke of the moving seal but insure stability axially of the bead and provide the desired concentricity. The bladder is pressurized through an annular air passage system and a sealed conduit extending radially through the pressure chamber inside the bead lock.

42 Claims, 7 Drawing Figures

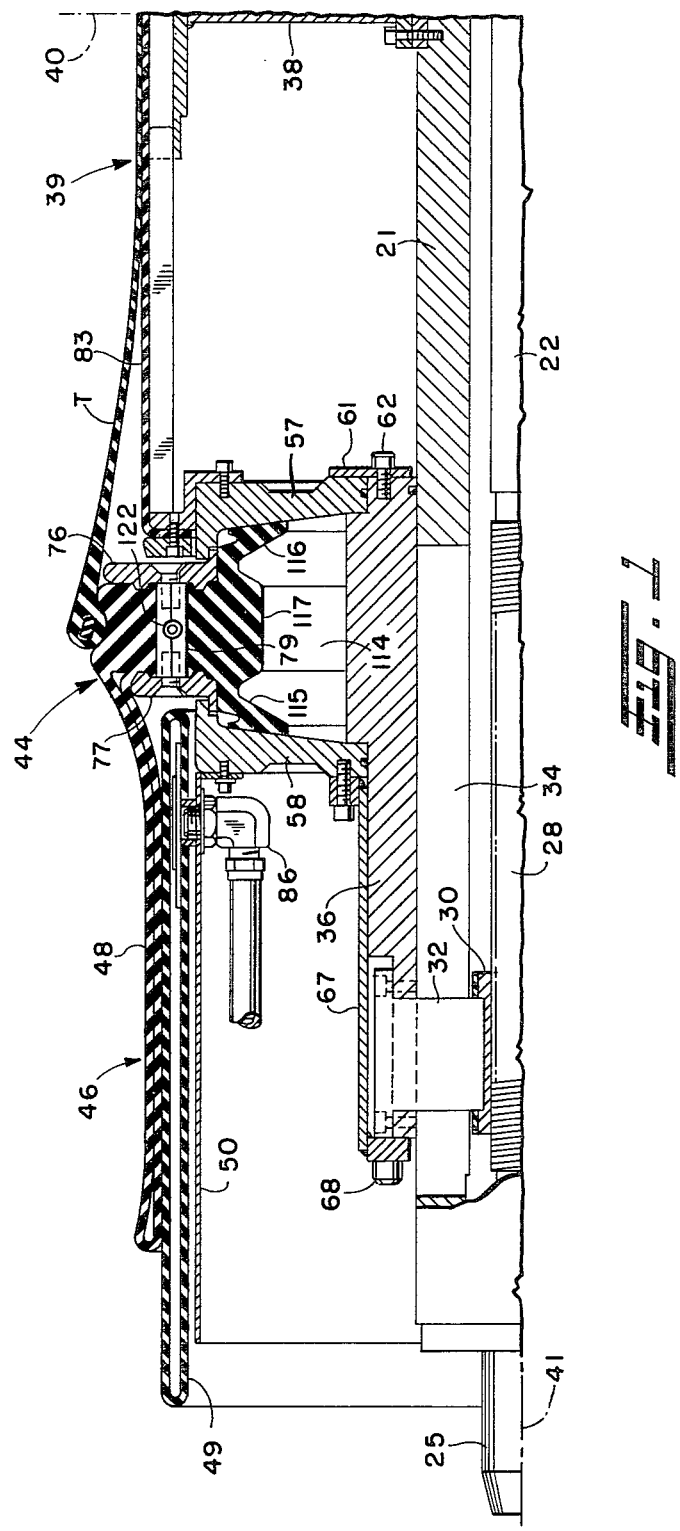

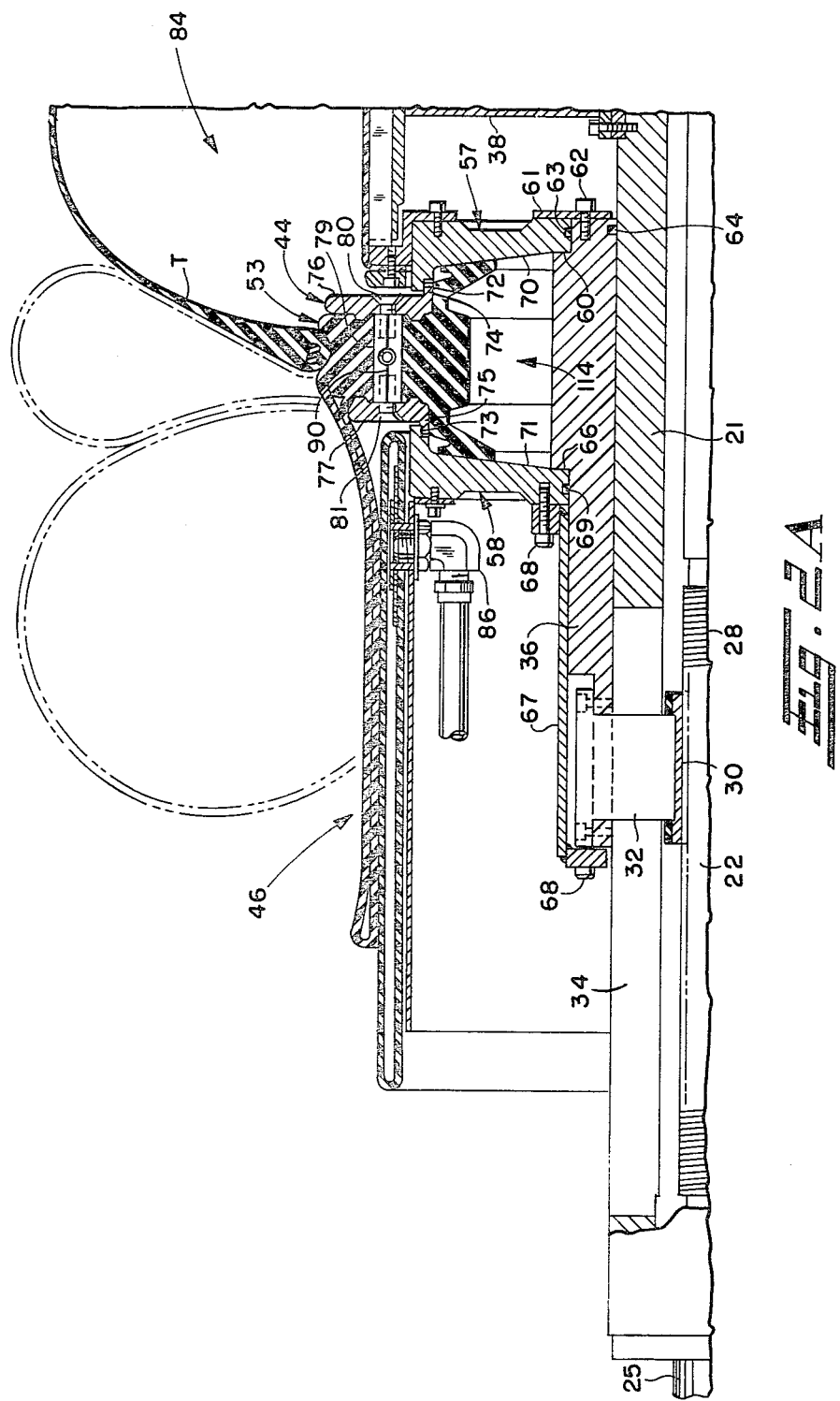

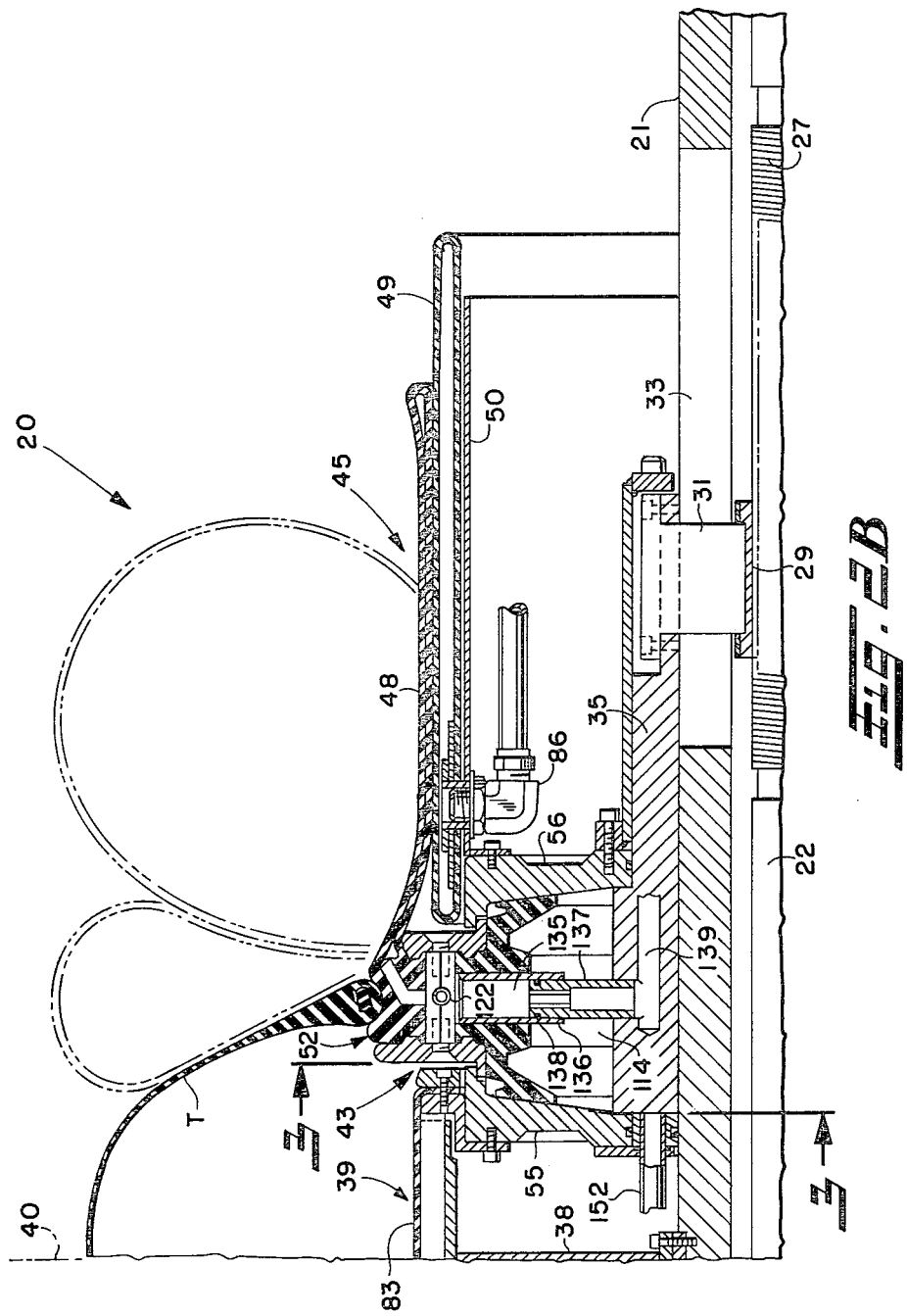

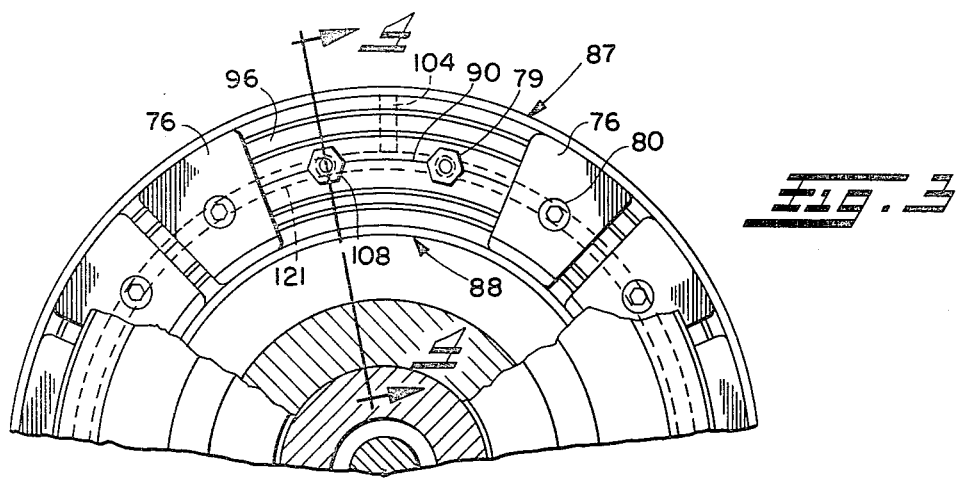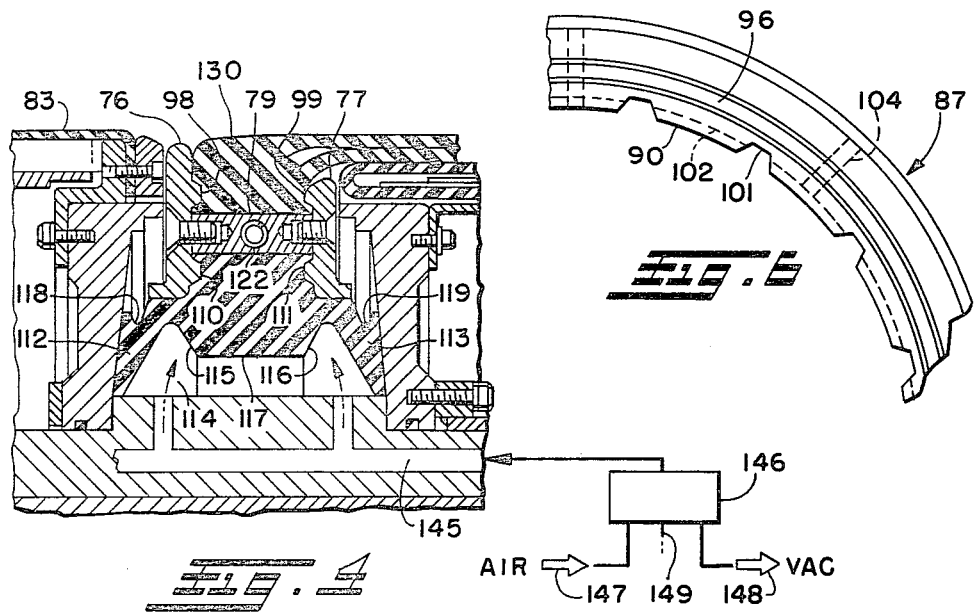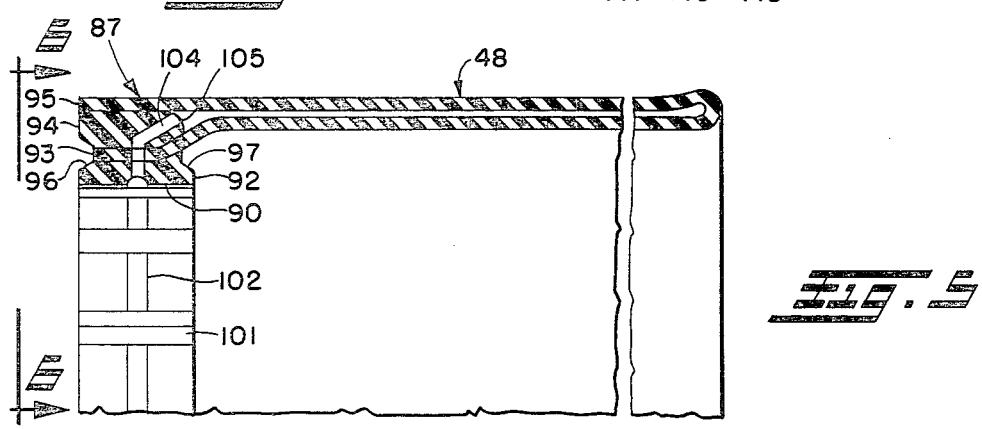

TIRE BUILDING MACHINE

This invention relates generally as indicated to a tire building machine and more particularly to a tire building machine of the bead lock type. High bead lock pressures may be obtained with a unique bead lock structure providing axial stability to insure precision forming and shaping of tires in the bead area. The invention finds particular application in the construction of larger and intermediate size tires such as truck or recreational vehicle tires. It will be appreciated that the features of the invention may also be employed in connection with smaller passenger car size tires.

BACKGROUND OF THE INVENTION

In a single stage machine a tire is constructed in a generally continuous process being initially built flat or cylindrical and then shaped to its toroidal shape for final application of the belt and tread assembly either separately constructed or constructed directly on the tire after being shaped. In a first stage machine the tire is constructed in cylindrical or flat band form and then removed to a second stage machine or shaper wherein it is converted to a toroidal shape for final application of components such as the belt and tread assembly.

Whether the machine be single, first or second stage, the beads of the tire must be properly supported and locked for the application or wrapping of the components thereabout. In a single or second stage machine, the bead locks move uniformly toward each other as the tire is expanded and converted from its generally cylindrical to a toroidal or tire shape. Regardless of the type of machine utilized, the beads must be firmly held and precisely positioned both with respect to the axial centerline of the machine as well as the transverse centerline. The beads must be equidistant from the transverse centerline which is through the crown of the tire. In addition, the bead locks in the shaping operation without a shaping sleeve desirably provide an air seal so that air under pressure within the tire will shape it to its desired toroidal shape as the bead locks move toward each other.

Where an elastomeric bead lock is employed, because of the inherent nature of any rubber band, it is difficult properly to seat and control the expansion and contraction of the bead lock to obtain precise centering of the beads both radially and axially. Any rubber band when elongated, narrows in cross section and accordingly the dimensions in the stressed and unstressed conditions are not the same. Moreover, when the bead lock includes an integrally formed shaping bladder, it is difficult to supply such bladder with inflation air pressure without unduly confining it thus precluding it from doing its desired function. The bladder is usually inherently restricted by an inlet or stem offset from the bead lock.

In negative crown tire building, plies of tire material are expanded beneath the bead to reduce the cord count uniformly in the area of the bead to permit the plies to be wrapped more uniformly around the bead without bunching or folding in the bead area. Where the plies include tough reinforcement such as steel or some of the more recent elastomers, considerable force and precision is required properly to seat the plies against the I.D. of the bead and then to wrap and hold the plies uniformly thereabout. This is particularly a problem in large size tires, and even more particularly a problem where complex beads are employed.

To obtain the desired concentricity and axial or lateral stability it has been found that metal contact is preferred. However, to obtain the large expansion force desirable, it has been found that it is preferable to expand the band of the bead lock by direct application of air pressure over a larger area than would be obtainable by utilizing an inflatable tube beneath the expandable bead lock.

The present invention then comprises an improvement over the type of bead lock shown and described in the copending application of George E. Enders, Ser. No. 886,742 filed Mar. 15, 1978 entitled "Tire Building Machine". In such prior application the annular elastomeric band or bead lock is expanded by the closed annular tube positioned radially beneath the bead lock band. While suitable for the construction of certain types of tires, it has been found that the force obrtainable to expand the bead lock is not as great as desirable for the proper construction of other types of tires. Moreover, in the bead lock as shown in the noted prior application, a rubber to metal seat is employed to obtain the desired concentricity and transverse alignment. Again, while suitable for certain types of tires, it has been found that a metal to metal contact is preferable, particularly during shaping wherein substantial axial forces may be exerted on the bead lock. In this manner it is important that the bead lock have axial stability. A prior attempt to provide direct inflation of the bead lock may be seen, for example, in Shichman et al. U.S. Pat. No. 4,081,310.

SUMMARY OF THE INVENTION

An elastomeric bead lock of the radially expansible type is employed and may be used in single, first or second stage operations on common machine shafting. The annular bead lock is a continuous rubber band which is mounted in a radially opening channel of isosceles trapezoidal configuration and has undercut axially extending edges which ride against specially coated sidewalls of the channel. The band of the bead lock as well as the radial section configuration of the channel compensate for the changes in cross section of the band as it expands and contracts. The bead lock is constructed with metal segments which provide metal to metal should stops. Such segments on each side of the bead lock are rigidly interconnected providing the bead lock with the desired axial or lateral stability in the expanded condition. The bead lock is directly inflated against the entire radial inner surface thereof providing substantially increased force during expansion. The metal side plates or sectors of the bead lock rigidly support the rubber under the bead, and insure stability and concentricity being interconnected by bars of hexagonal sectional configuration. The bead lock also is provided with an integrally formed shaping and turning bladder and in order to provide inflation air to such bladder, a coil spring is employed throu h the hexagonal bars in an annular air passage. Bladder inf. .ion air is provided to the annular air passage througn a sealed conduit extending radially through the expansion chamber beneath the bead lock. The conduit is in the form of a telescoping tube to segregate the air pressure beneath the bead lock from the air pressure to the shaping bladder.

The coil spring metallically interlocks the segments of the bead lock and insures that the annular air passage remains open even when the bead lock is expanded. The bead lock is thus comprised of a combination of a continuous elastomeric ring or rings having metallic components imparting to the ring the characteristics of both metal and rubber.

It is accordingly a principal object of the present invention to provide a tire building machine utilizing a radially expandable bead lock which when expanded will be precisely held both axially and radially with respect to the centerlines of the machine.

Another principle object is the provision of an elastomeric bead lock having a series of air passages therein which may be employed to inflate a shaping bladder formed integrally therewith.

Another important object of the present invention is the provision of an expansible bead lock which is directly inflated with the construction thereof obtaining substantial increases in force exerted radially.

Still another important object is the provision of a bead lock which incorporates the desirable characteristics of both elastomeric and mental construction.

A further object is the provision of a bead lock of an elastomeric type wherein lateral stability and concentricity are assured by metal to metal contact.

Still another object of the present invention is the provision of a bead lock which is mounted in the radially opening end of a channel having the configuration of an isosceles trapezoid to compensate for changes in dimension of the bead lock upon expansion.

Yet another object is the provision of a tire building machine having a bead lock wherein inflation air to the shaping bladder formed integrally therewith passes directly through the expansion chamber radially moving the bead lock.

Another object is the provision of a bead lock having fewer moving parts yet still obtaining the significant increase in force and the desired concentricity and lateral stability.

A yet further object is the provision of a directly inflated bead lock wherein vacuum may be employed to assist in contraction.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a fragmentary quarter section of a single stage machine in accordance with the present invention showing negative crown construction with the tire carcass still in its flat or band shape but with the bead locks expanded;

FIG. 2A is a view similar to FIG. 1 but illustrating the machine with the bead lock expanded and the bead locks moved toward each other to convert the tire carcass from the flat band to the toroidal shape;

FIG. 2B is a broken continuation of FIG. 2A, such figures being broken substantially on the transverse center of the machine;

FIG. 3 is a fragmentary elevation partially broken away and in section taken substantially from the line 3—3 of FIG. 2B;

FIG. 4 is a fragmentary radial section somewhat enlarged through the bead lock illustrating the bead lock in its unexpanded condition;

FIG. 5 is a radial section on a somewhat reduced scale of the outer portion of the bead lock incorporating the integrally formed bladder; and FIG. 6 is a fragmentary axial elevation of the bead lock as seen in FIG. 5 from the line 6—6 thereof.

DESCRIPTION OF THE PREFERRED EMBODIMENT

General Arrangement

Referring now to FIGS. 1, 2A and 2B it will be seen that the tire building machine shown generally at 20 is mounted on a main shaft 21 which is tubular and has journaled therewithin a screw shaft 22. The main shaft to the right as seen in such figures may be connected to a suitable drive mechanism which will rotate the shafts together or separately through a suitable clutch and brake drive in conventional manner.

The outboard end of the main shaft as seen to the left in such figures is provided with a pilot nose 25 which may be supported in a retractable tailstock or preferably by the carrier shown in copending application entitled "Modular Tire Building Machine," Ser. No. 886,743, filed Mar. 15, 1978.

The screw shaft 22 is provided with opposite hand threaded sections 27 and 28 which are in mesh with nuts 29 and 30, respectively, which include keys 31 and 32 projecting through slots 33 and 34 secured to the axial outer ends of inboard and outbard sleeves 35 and 36, all respectively. Such sleeves ride or slide on the exterior of the main shaft 21.

With the exception of the center support 38 of the center deck shown generally at 39, the major components are supported on such sleeves for axial sliding movement uniformly toward and away from the transverse centerline 40 of the machine which approximates the break line between FIGS. 2A and 2B. The other centerline of the machine is the axis 41 of the shafts 21 and 22, and of course the sleeves 35 and 36. For precision in tire construction, the components of the tire must be assembled with proper symmetry and squareness with respect to both centerlines.

In addition to the center deck 39, the other major components of the machine are the inboard and outboard bead lock assemblies shown generally at 43 and 44, as well as inboard and outboard dual bladder turn-up assemblies shown generally at 45 and 46. Each dual bladder assembly includes a radial outer bladder 48 and an inner bladder 49. When deflated as seen, the outer bladder lays over the inner bladder and both are supported in such condition in a cylindrical fashion by cylindrical can or extension 50. As indicated, each bead lock assembly includes a relatively large rubber band or ring seen at 52 and 53 and the outer bladder of each dual bladder assembly is formed integrally therewith.

The inboard bead lock assembly is supported for radial movement between flanges 55 and 56 secured to the sleeve 35 while the assembly 44 is secured for radial movement between flanges 57 and 58 secured to the sleeve 36. The flanges 55 and 57 are secured to the inner ends of such sleeves. Other than minor variations, such assemblies are identical.

Referring now to FIG. 2A it will be seen that the flange 57 is seated against shoulder 60 on the exterior of the sleeve 36 and is held in place by retaining ring 61 secured to the inner end of the sleeve by the fastener 62. An O-ring seal is provided between the flange and the exterior of the sleeve as seen at 63. A sliding seal is provided between the sleeve 36 and the shaft 21 as indicated at 64.

The flange 58 is secured against shoulder 66 by elongated flanged clamping sleeve 67 which is secured both to the end of the sleeve 36 and flange 58 by the fasteners 68. Again, an O-ring seal is provided between the inside of the flange and the exterior of the sleeve as seen at 69. The interior or facing faces of the flanges beyond the shoulders 60 and 66 are slightly radially symmetrically inclined toward each other and such inclined wall surfaces may be provided with a smooth coating of a high lubricity resin such as polytetrafluoroethylene as indicated at 70 and 71. The inside top edge of each flange is provided with the double shoulders seen with the outer shoulders 72 and 73 providing concentric stop surfaces for the interior outwardly facing L-shape flanges 74 and 75, respectively, of interconnected metal sector plates 76 and 77. Interconnecting each pair of sector or side plates 76 and 77 is a hex bar 79, each end of which is provided with a tapped hole to receive recessed head fasteners 80 and 81. The construction of each bead lock will hereinafter be more fully described.

Each inner flange 57 may also support the center deck 39 in the manner illustrated, such center deck comprising an array of interfitting axially projecting fingers as more clearly shown and described in the aforementioned copending application of George E. Enders, Ser. No. 886,742. Also, as indicated in such prior application, the center deck may be covered by an elastic sleeve 83 which may be perforated to permit the entire chamber between the inner flanges 57 and radially beneath the tire carcass T to be inflated to assist in shaping the tire to the toroidal configuration shown in FIGS. 2A and 2B.

Each outer flange 58 supports the cylinder or can 50 on which the bladders 49 are mounted with elbow fittings 86 projecting through the cans for inflation of such bladders.

Referring now more particularly to FIGS. 3-6 it will be seen that the rubber bands 52 and 53 forming the bead locks may be molded in two principal parts joined at a cylindrical circular parting plane which extends through the centers of the hex bar 79. The outer principal part 87 shown in more detail in FIGS. 5 and 6 includes the integrally formed bladder 48. The inner principal part 88 extends from the hex bars radially inwardly and closes the outer end of the trapezoidal chamber 89 formed by the flanges 57 and 58. The parting line between the parts is shown at 90 in FIGS. 2A and 3.

As seen more clearly in FIGS. 5 and 6, the outer party 87 itself may be formed of several parts which comprise an inner part 92, an inner edge of the bladder 48 seen at 93, an intermediate part 94, and the opposite outer edge of the bladder 95. On the inside of the band thus formed, the inner part together with the intermediate part and the edge of the bladder 93 form a truncated triangular groove 96 extending circumferentially of the band. On the outer side, a groove 97 of similar shape is formed between the inner part and the projecting bladder. In the assembled condition of the bead lock, such grooves receive projecting circumferential tongues of similar configuration on the insides of the side plates or sectors 76 and 77 as seen at 98 and 99 in FIG. 4.

In addition, the inner part 92 is provided with transverse half-hex recesses seen at 101 and an annular semicircular groove 102 in the middle thereof. At a number of circumferential locations around the band part, the circumferential groove 102 communicates with radially and angularly directed passages 104 which exit within the bladder 48 at the rounded corner of the intermediate part 94 as seen at 105. The parts of the outer band section 87 may be assembled as indicated in FIG. 5 prior to assembly with the inner band and the side plates or sectors before curing.

The inner portion 88 of the band includes an outer cylindrical surface designed to mate with the outer portion at the parting plane 90 and further includes in such surface half-hex recesses 108 designed to mate with the recesses 101. The inner portion also includes on each side thereof subjacent its outer surface or the parting plane annular grooves 109 in which are received the tongues 110 and 111 on the interior of the sector or side plates 76 and 77. Interiorly of such grooves, the exterior of the inner portion is configured to conform to the interior of the sectors or side plates. The inner portion also includes two legs 112 and 113, the outer or axial surfaces of which are coextensive with the symmetrical nonparallel sides of the isosceles trapezoid of the annular chamber 114 formed by the flanges 57 and 58.

To provide the desired degree of flexibility of such legs, they are undercut by the relatively large V grooves 115 and 116 on each side of the main body portion 117 on the interior surface thereof. Such interior surface closes the radial outer end of the isosceles trapezoid chamber 114. On the radial outer side of such legs, V grooves 118 and 119 are provided to impart to such legs the desired flexibility.

The outer surface of the inner portion of the band, in addition to being provided with the transverse half-hex recesses, is also provided with a semicircular outwardly facing groove 121 in the middle thereof. When the parts of the band are assembled, the groove 121 mates with the groove 102.

As seen more clearly in FIG. 4, each hex bar interconnecting the side or sector plates is provided with a transverse through bore. In order to assemble the completed band of the bead lock, a coil spring 122 is threaded through such holes much as the beads of a necklace would be threaded on a string. The hex bars thus assembled are then situated in the half-hex recesses of one of the band parts and the other band part is placed thereadjacent at the parting plane 90. The inner and outer sector or side plates are then assembled to the hex bars by the recessed head fasteners shown and the entire assembly may be then cured. The hex bars may be located approximately 22.5° apart and when secured together as indicated, such hex bars rigidly join the paired sector or side plates on each side of the stem or projecting portion of the bead lock. The coil spring not only serves mechanically to join the various parts together, but maintains the annular air passaage formed by the mating recesses 102 and 121 open even in the expanded position of the bead lock to permit air access to the bladder 48. The two major portions of the band of the bead lock may be cured to form an integral band or they may simply mechanically be held together by the assembled sector plates to facilitate removal and replacement of the bladder formed integrally with the stem or outer portion 87.

When thus assembled and positioned in the chamber formed by the opposed flanges, the metal side or sector plates act as one portion of the metal to metal guide system for the expanding bead locks. The exterior of the side or sector plates rides snugly against the opposed axial interiors of the inwardly facing shoulders of the chamber forming flanges. In this manner the bead lock cannot move axially during shaping of the tire or the tire components even though made primarily of rubber.

It is noted that the interior side or sector plates 76 extend radially somewhat further than the exterior side or sector plates 77 so that when collapsed the bead lock and the outer bladder will assume the position seen in FIG. 4. The exterior of the bead lock in the area of contact with the bead ring as seen at 130 in FIG. 4 may be flat or cylindrical in its unexpanded condition conforming to the bead and the ply material between the bead and band upon expansion as seen in FIGS. 1, 2A and 2B. Alternatively, the area of the bead lock at 130 may be recessed to conform specially to the bead of any customer's requirement.

In order to admit air to the outer bladder 48, it is important that the bladder expand beneath the bead and move tangentially up the sidewall of the carcass properly to fold and stitch the material to the carcass around the bead. This must ordinarily be done after the bead lock has been expanded and is properly gripping the bead and any subjacent ply material. This then requires that the air inlet for the outer bladder 48 be as close to the tire and bead as possible and yet be fully segregated from the air pressure which expands the bead lock. To accomplish this there is provided one or more radial air passages through the chamber 114 as seen more clearly in FIG. 2B. When forming the band of the bead lock, the inner portion of the band is provided with radially inwardly directed apertures 135 as seen in FIG. 2B in which are inserted radially inwardly projecting metal tubes 136. Such tubes telescope over radially projecting tubes 137 extending from the sleeve 35 centered between the shoulders 60 and 66. A sliding seal 138 is provided between such telescoping tubes. The projecting tubes 137 communicate with air passages 139 in the sleeve and also with the annular passage in the bead lock maintained opened by the coil spring 122. In this manner air may be supplied to the outer bladders entirely independently of the air pressure within the chamber 114.

Referring again to FIG. 4, it will be seen that air to expand the bead locks may be supplied through passage 145 in the sleeve from three-way or shuttle valve 146 from air pressure source 147. In order to facilitate proper collapse of the bead locks, a vacuum source 148 may also be connected to the passage 145. In this manner the shuttle valve 146 permits the chambers 114 to be pressurized from source 147, placed under vacuum from vacuum source 148, or vented through line 149.

As seen more clearly in FIG. 2B, it will be appreciated that the air, or vacuum, for the respective bead locks and bladders may be supplied to the bead lock assemblies on both sides of the centerline 40 of the machine through telescoping tubes as seen at 152. It will also be appreciated that such air and vacuum will normally be supplied through conventional rotary seals.

It can now be seen that there is provided a bead lock mechanism for a tire building machine of the single, first or second stage type wherein the bead locks are annular bands partly metal and partly rubber imparting characteristics of both to the bead lock. The bands are in the general form of an inverted T in radial section. The side plates or sectors cladding each side of the stem of the T move radially between the inturned flanges of the chamber forming flanges of the bead lock and are guided radially thereby. Such side plates or sectors insure lateral stability to the bead lock even in its expanded condition and particularly during shaping. The shaping and formation of large size truck tires exerts substantial force on the bead locks axially of the machine.

The flanges forming the guides for the bead lock form a trapezium and preferably an isosceles trapezoidal annular chamber with the smaller side being closed by the elastomeric bead lock of similar configuration. The air pressure in chamber 114 acting on the underside of the bead lock acts on a substantially larger area than would air pressure in a confined tube in such chamber. Moreover, the special configuration of the legs of the elastomeric band within such chamber permit both air pressure and vacuum to be employed for expansion and retraction, respectively. The network of air passages which passes through the transverse bores in the hex bars is supplid directly through the expansion chamber by the telscoping conduit seen more clearly in FIG. 2B.

Operation

With the machine of the present invention, a wide variety of process or building steps may be employed depending upon the components employed in the tire. For illustrative purposes only, the following is a brief discussion of the sequential steps which may be employed to construct a relatively large truck tire.

In the start position the center deck 39 is axially extended as seen in FIG. 1 and the bead locks as well as the shaping bladders are initially exhausted. In its full flat condition, the machine forms an elongated generally cylindrical drum having a diameter somewhat less than the inside diameter of the bead of the tire to be built.

Initially, the operator will place an inner liner on the drum carefully centering the same with respect to the transverse centerline 40 followed by components such as wire chafers, the body ply, sidewalls and belt cushions. The body plies of course extend axially beyond the bead locks. The sidewalls may be applied directly to the deflated cylindrical or flat outer bladders 48. Belt cushions may be stitched to the body ply and are in the form of fillets between the belt and body ply when the tire is finished. After such components are applied and stitched as necessary, a bead setting mechanism may be employed properly to position the beads with respect to the bead locks. The bead locks are now expanded into the beads to the condition seen in FIG. 1. As the bead locks expand, the body plies stretch or enlarge in the area of the beads reducing the cord count uniformly circumferentially of the bead at the I.D.

When constructing radial tires, the cords or reinforcement of the body plies extend axially of the drum and in order to wrap such plies uniformly around the beads B free of distortion and wrinkling, it may be desirable axially circumferentially uniformly to stretch the body plies in the area of the bead. This is of course done by expanding the bead lock since the diameter of the body plies in the area of the bead is then significantly greater than the diameter of the plies at the crown or transverse centerline 40. The process illustrated is known as "negative crown" building.

After the beads are locked, a bead apex or fillers may be applied inside the beads. Some beads already include the apex or filler.

At this point the tire carcass C may be slightly inflated simply to insure that the carcass is free of the sleeve 83 of the center deck 39. In such pre-inflation, the carcass may bulge outwardly approximately to the same extent as the negative crown seen in FIG. 1. In order to insure that the beads will not move, the outer bladders 48 may be slightly pre-inflated.

With the bead locks continuing in their expanded condition, the carcass may be now preshaped to approximately 80% of its final shape such as seen in FIGS. 2A and 2B. This is accomplished by locking the main shaft 21 by rotating the screw shaft 22. The center deck 39 automatically axially contracts as the carcass is inflated and the bead locks move uniformly toward each other. At this point a previously constructed belt or belt and tread assembly may be transferred axially of the machine to the transverse centerline 40. In such position the belt is held by a transfer at the transverse centerline 40. The carcass is then fully shaped into the interior of the belt.

At this point the outer bladders 48 may be fully inflated to wrap the body plies around the bead. Initially only the outer bladder 48 may be inflated and as it is inflated it will press against the outside of the tire T uniformly and sequentially pressing against an enlarging area moving away from the bead B. In such condition the bead area will then be tightly wrapped and the sidewalls positioned on the outer bladder may begin to adhere to the carcass. Not only must the bead lock maintain the bead against axial or lateral distortion during shaping, but also most importantly during the application of the forces when the two bladders are inflated for wrapping the material around the bead as indicated.

The inner bladders 49 are now inflated to force the outer bladders 48 and the sidewall carried thereby to move tangentially up the sidewall of the carcass. Full inflation of both bladders will cause the outer edge of the sidewalls to snap or flip over as the sidewall in effect turns itself inside out.

The inner bladders may now be deflated and when deflated they return to their generally cylindrical flat condition. The outside bladder, however, may remain inflated or partially inflated to lock the bead securely during stitching. After both bladders are deflated, the bead locks may be collapsed and the tire removed. The bead locks may then transverse outwardly to their original position and another tire may be constructed.

It will be appreciated that the steps described may vary considerably and that the sequence may also vary. For example, some tires are built with the sidewall over the tread and others are built with the tread over the sidewall. In the latter case the sidewall may be applied before the tread. Also the belt or belt and tread assembly may be constructed directly on the shaped carcass or band as the tire in its shaped condition is rotated.

It will further be appreciated that the machine of the present invention may be used simply as a first stage machine or simply as a second stage shaping machine. In the case of the former, the center deck need not contract and the bead locks need not move toward each other. The dual bladder assemblies would simply inflate, usually simultaneously, to wrap the plies around the bead. The bead locks would then release the unshaped tire band. The tire band would then be shaped and completed at a second stage machine such as described below. Components such as sidewalls and belt cushions could be stitched to the cylindrical band prior to shaping, particularly in view of the essentially rigid nature of the center deck.

The bead locks of the present invention may of course be used simply in a second stage machine depending on the type of tire and bead employed. A previously completed cylindrical tire band formed on a first stage machine would simply be telescoped over the collapsed bead locks in their axially expanded condition. When aligned with the beads, the bead locks would be radially expanded firmly gripping the interior of the carcass at the bead area. Then, as the carcass is inflated, the bead locks would move uniformly toward each other converting the tire band from cylindrical to toroidal or tire shape. The carcass may be inflated into a previously prepared belt and tread assembly positioned by a carrier or transfer at the transverse centerline of the machine.

Whether employed in a single stage, first stage, or second stage machine, the bead locks of the present invention provide greater bead gripping force, improved lateral or axial stability, even when expanded, and better concentricity and squareness with the two axes of the machine and thus the tire being build.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. A tire building machine comprising bead locks, each comprising an outwardly opening annular trapezoidal chamber directly closed by an annular elastic ring of similar configuration, said chamber being in the form of a trapezoid having a more narrow end facing radially outwardly, and said elastic ring being in the configuration of an inverted T in radial section.

2. A machine as set forth in claim 1 wherein said chamber is formed by two flanges and a sleeve, said flanges including facing radially symmetrically inclined walls.

3. A machine as set forth in claim 2 wherein each flange includes an inwardly directed stop flange restricting the opening of the chamber.

4. A machine as set forth in claim 3 wherein the stem of the T projects through the opening.

5. A machine as set forth in claim 4 including sector plates secured to each side of the stem of the T and radially guided by said stop flanges.

6. A machine as set forth in claim 5 wherein each sector plate includes an inner stop flange adapted to engage the first mentioned stop flanges to limit expansion of the bead lock.

7. A machine as set forth in claim 5 wherein said sector plates are paired on opposite sides of said stem, each pair being rigidly interconnected through the stem.

8. A machine as set forth in claim 7 including a bar interconnecting each of said paired sector plates through said stem.

9. A machine as set forth in claim 8 including a transverse hole in each bar, and an annular air passage in said stem aligned with each transverse hole.

10. A machine as set forth in claim 9 including a coil spring in said annular air passage threaded through each transverse hole.

11. A machine as set forth in claim 10 including a shaping bladder integrally formed with said stem, and radially and angularly directed branch air passages interconnecting said annular air passage with said bladder.

12. A machine as set forth in claim 11 including radially extending conduit means extending through said chamber operative to supply said annular air passage with air pressure to inflate said bladder.

13. A machine as set forth in claim 12 wherein said conduit means comprises telescoping sealed tubes.

14. A machine as set forth in claim 2 wherein the head of the inverted T is confined in said chamber with the lateral edges thereof riding against the facing walls of said flanges.

15. A machine as set forth in claim 14 wherein the lateral edges of the head of the T are undercut to provide a desired degree of flexibility.

16. A machine as set forth in claim 15 wherein the undercut is provided by V-shape grooves.

17. A machine as set forth in claim 16 wherein such V-shape grooves are provided on both sides of the head at the edges with the grooves on the interior of the ring being larger.

18. A machine as set forth in claim 2 wherein the facing walls of the flanges are coated with a high lubricity plastic material.

19. A machine as set forth in claim 2 including means to apply air pressure or vacuum to the chamber to facilitate expansion and contraction of the ring, respectively.

20. A machine as set forth in claim 1 including a shaping bladder formed integrally with at least a portion of said ring, and radially extending conduit means extending through said chamber to supply air pressure to said bladder.

21. A machine as set forth in claim 20 wherein said conduit means comprises telescoping tubes, one of which is fixed to said ring.

22. A tire building machine comprising bead locks, each comprising an expansible annular elastic ring, a plurality of axially facing metal guide segments secured to said ring, and radially extending guide means for said segments operative to preclude said ring from flexing axially when expanded.

23. A machine as set forth in claim 22 wherein said segments include stop flanges limiting radial expansion of said ring.

24. A machine as set forth in claim 22 wherein said segments are paired on opposite sides of said ring, each pair being rigidly interconnected through said ring.

25. A machine as set forth in claim 24 including a bar interconnecting each pair through said ring.

26. A machine as set forth in claim 25 wherein said ring is molded in two radially contiguous pieces, the parting plane of which is at said bars.

27. A machine as set forth in claim 26 wherein each piece is formed with mating recesses at such parting plane to accommodate said bars.

28. A machine as set forth in claim 26 wherein each piece is formed with annular laterally facing grooves near the parting plane, each segment including an inwardly facing tongue adapted to mate within the respective groove when the ring and segments are assembled.

29. A machine as set forth in claim 25 wherein each bar is hexagonal in transverse section and is secured at each end to a respective segment by a recessed fastener.

30. A machine as set forth in claim 25 including a transverse hole in each bar, and an annular air passage in said stem aligned with each transverse hole.

31. A machine as set forth in claim 30 including a coil spring in said annular air passage threaded through each transverse hole.

32. A machine as set forth in claim 31 including a shaping bladder integrally formed with said stem, and radially and angularly directed branch air passages interconnecting said annular air passage with said bladder.

33. A machine as set forth in claim 32 including radially extending conduit means extending through the inner piece of said ring to supply said annular air passage with air pressure to inflate said bladder.

34. A machine as set forth in claim 33 wherein said conduit includes telescoping tubes, one of which is molded into said ring.

35. A machine as set forth in claim 22 wherein said ring is formed of inner and outer parts, said guide means interfitting with said parts to lock the same together.

36. A tire building machine comprising bead locks, each comprising an outwardly opening annular chamber closed by an annular expansible elastic ring, a turning and shaping bladder formed integrally with at least a portion of said ring, an annular air passage in said ring communicating with said bladder, and sealed conduit means extending radially through said chambers communicating with said annular air passage.

37. A machine as set forth in claim 36 wherein said sealed conduit comprises telescoping tubes.

38. A machine as set forth in claim 37 wherein one of said tubes is molded into said ring.

39. A machine as set forth in claim 38 wherein the other of said tubes is fixed with respect to said ring and projects into said chamber.

40. A machine as set forth in claim 5 wherein said sector plates rigidly support the radially outer portions of the ring.

41. A machine as set forth in claim 6 wherein said sector plates and said flanges of which said chamber is formed cooperate to insure accurate axial concentricity and to prevent axial flexure of the ring.

42. A machine as set forth in claim 1 wherein said chamber is in the form of an isosceles trapezoid.

* * * * *